(12) United States Patent
Hodgson et al.

(10) Patent No.: US 10,287,955 B2
(45) Date of Patent: May 14, 2019

(54) MODULE FOR THE METERED PROVISION OF A LIQUID

(71) Applicant: CONTINENTAL AUTOMOTIVE GMBH, Hannover (DE)

(72) Inventors: Jan Hodgson, Troisdorf (DE); Georges Maguin, Marly (FR); Philippe Mertes, Faulquemont (FR); Michael Metral, Faulx (FR); Sven Schepers, Troisdorf (DE); Christian Vorsmann, Koeln (DE)

(73) Assignee: Continental Automotive GmbH, Hannover (DE)

( * ) Notice: Subject to any disclaimer, the term of this patent is extended or adjusted under 35 U.S.C. 154(b) by 27 days.

(21) Appl. No.: 14/898,068

(22) PCT Filed: Jun. 13, 2014

(86) PCT No.: PCT/EP2014/062326
§ 371 (c)(1),
(2) Date: Dec. 11, 2015

(87) PCT Pub. No.: WO2014/198870
PCT Pub. Date: Dec. 18, 2014

(65) Prior Publication Data
US 2016/0146082 A1    May 26, 2016

(30) Foreign Application Priority Data

Jun. 13, 2013 (EP) .................................. 13290139

(51) Int. Cl.
*F01N 3/20* (2006.01)
*F01N 3/28* (2006.01)
*G01F 15/00* (2006.01)

(52) U.S. Cl.
CPC ........... *F01N 3/2896* (2013.01); *F01N 3/206* (2013.01); *F01N 3/2066* (2013.01);
(Continued)

(58) Field of Classification Search
CPC ...... F01N 3/206; F01N 3/2066; F01N 3/2885; F01N 3/2896; F01N 2610/02;
(Continued)

(56) References Cited

U.S. PATENT DOCUMENTS

2008/0256937 A1* 10/2008 Suzuki .................... F01N 3/105
60/300
2010/0220984 A1   9/2010 Potier et al.
(Continued)

FOREIGN PATENT DOCUMENTS

CN      102822467       12/2012
DE   10 2010 029594    12/2011
(Continued)

OTHER PUBLICATIONS

Office Action dated Apr. 13, 2017 which issued in the corresponding Korean Patent Application No. 10-2016-7000824.

*Primary Examiner* — Brandon Lee
(74) *Attorney, Agent, or Firm* — Cozen O'Connor

(57) ABSTRACT

A module for the metered provision of a liquid includes a chamber having a chamber wall enclosing, at least partially, a chamber space of the chamber. The chamber is surrounded at least partially by a hood. At least one cavity is arranged between the hood and the separated chamber and the hood is heatable.

11 Claims, 5 Drawing Sheets

(52) U.S. Cl.
CPC .......... *F01N 3/2885* (2013.01); *G01F 15/00* (2013.01); *F01N 2610/02* (2013.01); *F01N 2610/10* (2013.01); *F01N 2610/1406* (2013.01); *Y02T 10/24* (2013.01)

(58) Field of Classification Search
CPC ......... F01N 2610/10; F01N 2610/1406; G01F 15/00; Y02T 10/24
See application file for complete search history.

(56) References Cited

U.S. PATENT DOCUMENTS

| | | |
|---|---|---|
| 2011/0056961 A1 | 3/2011 | Amtmann et al. |
| 2011/0283689 A1 | 11/2011 | Wilkins |
| 2012/0311999 A1 | 12/2012 | Hodgson et al. |
| 2013/0025269 A1* | 1/2013 | Hodgson ............... F01N 3/2066 60/317 |
| 2014/0174058 A1 | 6/2014 | Maguin et al. |

FOREIGN PATENT DOCUMENTS

| | | | |
|---|---|---|---|
| KR | 2010-0024937 | 3/2010 | |
| WO | WO 2011124637 A1 * | 10/2011 | ........... F01N 3/2066 |
| WO | WO 2013/030066 | 3/2013 | |

* cited by examiner

MODULE FOR THE METERED PROVISION OF A LIQUID

CROSS-REFERENCE TO RELATED APPLICATIONS

This is a U.S. national stage of application No. PCT/EP2014/062326, filed on 13 Jun. 2014, which claims priority to the European Application No. EP 13290139 filed 13 Jun. 2013, the content of both incorporated herein by reference.

BACKGROUND OF THE INVENTION

1. Field of the Invention

The invention relates to a module for the metered provision of a liquid. The module can be installed into a tank, in order to remove liquid from the tank and to provide it in a metered manner. The module can be used, in particular, in a motor vehicle, in order to meter a liquid additive for exhaust gas purification from a supply tank into an exhaust gas treatment apparatus.

2. Related Art

Such modules can be used, in particular, for exhaust gas treatment apparatuses, in which the SCR method (SCR=selective catalytic reduction) is carried out. In the SCR method, nitrogen oxide compounds in the exhaust gas of the internal combustion engine are reduced with the aid of a reducing agent. Ammonia is usually used as reducing agent. Ammonia is often not stored directly in motor vehicles, but rather in the form of a liquid additive that can be converted into ammonia within the exhaust gas (within the exhaust gas treatment apparatus) and/or outside the exhaust gas (in a reactor which is provided for this purpose). A liquid additive used for the exhaust gas purification is urea/water solution. A 32.5% urea/water solution is available under the commercial name AdBlue® for use in the SCR method.

In the construction and the design of modules for the metered provision of liquid additives, it is to be noted that the liquid additives freeze at low temperatures. The above urea/water solution freezes, for example, at a temperature of −11° C. Low temperatures of this type can occur in motor vehicles during long stationary times in winter. In particular in the urea/water solution, a volumetric expansion occurs during freezing, which volumetric expansion can damage the module and/or the tank in which the module is installed, for example by a line or a component for delivering the liquid additive being deformed or even broken open. A module for the provision of a liquid additive should be constructed in such a way that it is not damaged during (repeated) freezing of the liquid additive. In addition, it is desirable in motor vehicles that liquid additive can already be provided briefly after the operational starting of the motor vehicle. This produces difficulties, in particular, when the liquid additive has frozen. In order to heat the liquid additive in the tank, it is known to provide a heater in the tank, by way of which heater the liquid additive can be heated. A heater of this type should be operated with energy consumption which is as low as possible.

SUMMARY OF THE INVENTION

Taking this as a starting point, it is an object of the present invention to solve or alleviate the technical problems highlighted in connection with the prior art. In particular, a particularly advantageous module for the metered provision of a liquid is disclosed, which module can be used in a tank for storing the liquid and which can be heated.

According to an aspect of the invention, these objects may be achieved by a module according to the features disclosed herein. The features which are described individually can be combined with one another in any desired, technologically appropriate way and can be supplemented by explanatory facts from the description, further embodiments of the invention being indicated.

According to one aspect, the invention relates to a module for the metered provision of a liquid having a chamber which has a chamber wall which encloses a chamber space of the chamber at least partially, the chamber being surrounded at least partially by a hood, at least one cavity existing between the hood and the chamber, and the hood being heatable.

The module (the structural unit) is to be capable, in particular, of being mounted in a position in the region of the bottom of a tank (tank bottom). This provided position can also be called the installation location or the installation position of the module. The tank is preferably suited for installation in a motor vehicle. Tanks of this type are routinely produced from plastic with the aid of an injection molding process. The tank has a tank wall which encloses an interior. The liquid which is stored in the tank, in particular the urea/water solution, is situated in the interior.

The module can be integrated permanently into the tank bottom. For example, the module can be connected to the tank bottom by a welded connection or an encapsulation with a plastic material. It is also possible that the module is arranged releasably in an opening in the tank bottom, with the result that the module closes the opening in the tank bottom. In the installed state on the tank, the chamber of the module forms a chamber separated from an interior of the tank. Components that serve to convey the liquid out of the tank are arranged in the chamber of the module. An intake point is provided on the chamber, which intake point is positioned so as to adjoin an interior of the tank when the chamber is arranged in the provided position on the tank. Starting from the intake point, a delivery line leads through the chamber of the module to a provision connector, at which the liquid is provided. The provision connector is preferably situated at a section of the chamber, which section does not lie in the interior of the tank, but rather forms an outer wall which is accessible from outside the tank when the chamber is arranged in the provided position on the tank. A pump is situated in the chamber at the delivery line, by which pump the liquid can be delivered and possibly also metered.

The chamber space is preferably free of the liquid, the contents of the delivery line during operation not being taken into consideration here. The chamber can therefore also be called a "dry" chamber separated (from the interior of the tank).

The chamber wall, which encloses the chamber space of the chamber is preferably produced from plastic, for example with the aid of an injection molding process. However, the chamber can also be produced from a metallic material or comprise a composite material of plastic and metal.

The hood surrounds the chamber such that it is situated completely within the interior of the tank when the module is situated in the installation position in the tank. In the installation position, the chamber of the module has a top side. The top side is that side of the chamber that lies opposite the tank bottom. Here, the term "hood" means that the hood has a downwardly directed opening and is substantially closed at the top (at the tank top side). Here, any structure which has an open underside and a substantially closed top side is considered to be a hood. A hood can have, in particular, a pot shape, tank shape, cup shape, pan shape, bell shape or the like. A hood can also have a cylindrical circumferential face, the latter being closed on (only) one end side (the top side) by a (preferably closed) lid. The hood can, in particular, also be called a bellshaped hood.

A cavity between the hood and the separated chamber means, in particular, a space that is delimited at least in sections by the hood and the chamber wall of the separated chamber. In other words, this means that the chamber wall and the hood are spaced apart from one another radially. It is not necessary here that the cavity is enclosed completely by the chamber wall of the separated chamber and the hood. Rather, the hood also defines a spatial boundary of the cavity. The cavity is particularly preferably formed in the manner of a hollow cylinder, which is situated on the outside between the chamber wall of the chamber and the hood. The cavity is preferably connected in a liquid-conducting manner to the interior of the tank, with the result that the liquid can flow out of the interior of the tank into the cavity and optionally can also flow out of the cavity back into the interior of the tank. When the module is arranged in the installation position on the tank, an annular gap preferably exists between the hood and the tank bottom, which annular gap runs around the chamber and forms the fluid-conducting connection between the interior of the tank and the cavity.

The (preferably only) intake point, at which the pump removes liquid from the tank, is preferably situated in the vicinity of the top side of the chamber and/or the hood on the cavity. Liquid from the tank is therefore sucked through the annular gap and/or the cavity to the intake point. A filter is preferably situated in the cavity. The filter is preferably of cylindrical configuration. It is also possible that the filter forms only a circular arc segment of a cylinder. The filter preferably surrounds the chamber at least in sections and preferably even completely in the circumferential direction. The filter is also optionally protected by the hood.

The module can also have a flange on the underside, which flange makes mounting of the module in an opening on the tank bottom of a tank possible. The flange is configured, in particular, such that the module can be mounted with the hood in the tank. The diameter of the flange is therefore preferably greater than the diameter of the hood. This makes simple installation of the module through the opening possible.

The hood can be heated. This means that heat can be generated in some way in the hood (in an active and/or targeted manner) and/or heat can be transported into the hood and can be distributed via the hood. In the case of an arrangement of the module in a tank, the hood is situated in the tank and is bathed (almost) completely by the liquid because liquid is situated both in the surroundings of the hood in the interior of the tank and in the cavity between the hood and the separated chamber. Starting from the hood, it is therefore possible to heat the liquid in the tank in a particularly effective way and optionally also to melt it if the liquid is frozen in the tank.

It is particularly preferred if the hood is made from metal. A hood made from metal has particularly satisfactory thermal conductivity and is suitable for distributing heat in the tank. The hood is particularly preferably made from aluminium. Firstly aluminium is light and secondly aluminium makes particularly satisfactory thermal conduction possible.

Furthermore, it is advantageous if the hood is coated with a plastic layer with a layer thickness of less than 30% of a metal thickness of the hood.

Here, the metal thickness denotes the thickness of the metallic material of the hood. The hood preferably has a metal thickness between 1.5 mm and 5 mm (millimeters). The metal thickness of the hood is therefore selected in such a way that sufficient thermal conductivity through the cross section of the hood is possible and at the same time the material requirement for the hood and the weight of the hood are not too great. The layer thickness of the plastic layer is then preferably in a range of between 0.2 mm and 1.0 mm (millimeter). A layer of this type makes it possible to protect the hood against the liquid in the tank. This is important, in particular, when the metal, from which the hood is formed, is not suitable to withstand the (for example, corrosive) action of the liquid (such as urea/water solution) for a long time. At the same time, however, the plastic layer is so thin that sufficient thermal conductivity from the metallic material of the hood into the liquid in the tank is possible. The plastic layer namely typically has an insulating effect, and said insulating effect is lower the thinner the layer thickness.

Furthermore, it is advantageous if the hood is made from plastic and at least one of the following components is integrated into the hood:
  at least one heating element, and
  at least one heat distribution structure.

A hood of this type which is made from plastic is preferably produced by way of an injection molding process. Heating elements can be, for example, electric heating wires and/or heating lines and/or PTC heaters which are injection-molded, cast and/or let into the hood. Here, the term "heating element" also comprises, in particular, liquid lines and/or gas lines, through which a heating liquid and/or a heating gas can pass into the hood. Heat distribution structures can be, for example, wires and/or other metal structures (for example, metal sheets, inserts, etc.) which are injection-molded, cast and/or let into the hood.

A hood made from plastic is preferably connected fixedly to the chamber wall of the module. It is possible, for example, that the chamber wall of the chamber and the hood are produced by way of a common injection molding process, with the result that the hood and the chamber form a common (integral) component. If the hood is made from metal and the chamber or the chamber wall is made from plastic, the chamber and the hood are connected to one another (preferably subsequently). For example, a metallic hood can be plugged and/or screwed (in a fluid-tight manner) onto the chamber which is made from plastic.

Furthermore, the module is advantageous if the chamber wall has a chamber opening which is closed by the hood.

Here, a chamber opening means an opening that penetrates the chamber wall at a point oriented towards the interior of the tank in the installation position of the chamber. By a chamber opening of this type, it is possible to make (electric and/or thermally conducting) contacting of the hood possible starting from (the chamber space which lies on the inside of) the chamber. This is appropriate, for example, when at least one electric heating element is arranged in the hood. Electric lines can then be guided through the chamber opening (which is closed again during operation) from the hood into the chamber space of the chamber.

Furthermore, the module is advantageous if the hood is connected in a material-to-material manner (in other words "materially integral" manner) to the chamber wall at the chamber opening, in particular in order to close the chamber opening in a fluid-tight manner.

All connections are called material-to-material, in which the connecting partners are held together by way of atomic or molecular forces. They are usually at the same time non-releasable connections, which can be separated only by way of destruction of the connecting means.

A material-to-material connection does not have to be produced separately if the hood and the chamber wall of the chamber are produced from plastic and are manufactured by way of a common injection molding process. If the hood is made from metal and the chamber is made from plastic, there are difficulties in producing a material-to-material connection between the chamber and the hood, because material-to-material connections are not routinely produced between metallic materials and plastic. A material-to-material connection between the hood and the chamber then requires that a plastic is used (at least in sections) for the chamber, which plastic is capable of entering into a chemical material-to-material connection with the metallic material of the bell. In addition or as an alternative, it is possible that the hood has the plastic layer which is described further above. This plastic layer can then be connected in a material-to-material manner (in particular, welded) to the plastic material of the chamber wall.

Furthermore, it is advantageous if the hood is sealed at the chamber opening by way of a seal, in order to close the chamber opening of the chamber in a fluid-tight manner.

A seal of this type can be, for example, an O-ring seal inserted, for example, into a groove on the hood and into a further groove that surrounds the chamber opening, and that is placed under stress, in order to seal the hood on the chamber wall. The seal can be placed under stress, for example, with the aid of a screw connection provided on the hood and on the chamber wall.

Moreover, the module is advantageous if the hood is connected at the chamber opening to an electric heating element arranged in the chamber space.

This exemplary embodiment is advantageous, in particular, when the hood is produced from a metallic material with high thermal conductivity (for example, aluminium). A direct contact of the metallic material of the hood with the electric heating element preferably exists. A direct contact of this type can be achieved, for example, by virtue of the fact that an uncoated metallic section of the hood is accessible from the chamber through the chamber opening of the chamber.

If the hood is coated with a plastic layer, a region of the hood in the region of the chamber opening is preferably free of the plastic layer.

Moreover, it is possible that the hood and the electric heating element are in indirect thermally conducting contact with one another via a (preferably metallic) contact. A contact of this type can be, for example, a metallic contact plate that is let into the chamber wall of the chamber, is metallically uncoated on both sides and forms a metallic aperture of the chamber wall. However, a contact plate of this type should be resistant to the liquid provided by the module, if it is not covered completely by the hood. The metallic contact plate then makes (satisfactorily thermally conducting) contact with the (preferably metallic) hood possible on its side which is directed to the outside. The metallic contact plate makes contact with the heating element possible in the chamber space.

Furthermore, the module is advantageous if the hood has a plurality of slots divide the hood into web-shaped sections extending from a top side of the separated chamber to a bottom side of the separated chamber.

Here, the bottom side is arranged on the tank bottom when the module is installed into a tank for storing the liquid. The slots for forming the web-shaped sections are preferably arranged perpendicularly and extend, starting from an a bottom side of the hood, in the direction of the top side. The web-shaped sections form a comb-like structure on the circumferential face of the hood. The web-shaped sections can be configured such that they make contact with the tank bottom when the module is installed into the tank. The slots then form a plurality of passages from an interior of the tank into the cavity between the hood and the chamber wall of the chamber. It is also possible that the web-shaped sections are not so long that they reach as far as into the tank bottom, but rather in each case individually protrude freely into the interior of the tank. When the module has been in-stalled into the tank, the annular gap, which has already been described further above, exists between the hood and the tank bottom, through which annular gap liquid can pass from the interior of the tank into the cavity. The web-shaped sections, which protrude freely into the interior of the tank, form a protection for the chamber. The web-shaped sections are preferably designed such that they can be elastic. If ice exists in the tank and is accelerated by a movement of the tank, that elastic web-shaped sections can absorb impacts which would otherwise act directly on the separated chamber.

Furthermore, the module is advantageous if the hood has at least one slot which insulates a region of the hood thermally.

A slot of this type is, in particular, a horizontal slot arranged along a circumferential face of the hood. A slot of this type preferably isolates a region of the hood on the bottom side with respect to the top side of the hood. Slots of this type can also be arranged in the form of a slot pattern having a plurality of rows of slots arranged parallel to the circumferential direction and arranged in each case in such a way that they overlap one another at least partially, and that narrow webs are formed between the slots. This then results in relatively long diffusion paths for heat along the webs, starting from the top side of the hood as far as the underside. At the same time, high mechanical stability of the hood is maintained. Furthermore, thermal insulation of this type on a hood makes it possible to influence the heat distribution generated by the hood in a targeted manner, with the result that defined regions of the hood are heated to a greater or lesser extent. It is also possible to provide thermal insulation of this type, to achieve precisely a particularly homogeneous distribution of the heat in the hood. This is possible, in particular, when the introduction of heat into the hood takes place at a less centrally situated position (for example, eccentrically at a defined point of the top side of the hood) and/or when the heat dissipation from the hood into the liquid in the tank is non-homogeneous.

Furthermore, the module is advantageous if the hood has a ventilation opening that connects the cavity on a top side of the chamber to the surroundings of the chamber.

The ventilation opening on the top side of the hood has a small cross section in comparison with the opening on the underside of the hood. The cross-sectional area of the ventilation opening is preferably more than 10 times smaller and particularly preferably more than 50 times smaller than the overall cross-sectional area of an annular gap on the underside of the hood. The ventilation opening can have, for example, a cross-sectional area of less than 10 mm$^2$ [square millimeters]. A ventilation opening of this type can prevent an air cushion which impedes the delivery of liquid from forming in the hood or in the cavity between the hood and the chamber.

Furthermore, the module is advantageous if the hood has at least one spacer element on the inner side which is oriented towards the chamber, which spacer element bears against the chamber wall, in order to maintain the thickness of the cavity.

The thickness of the cavity describes, in particular, a gap size between the chamber wall of the chamber and the hood. A spacer element can be formed, for example, by a component inserted into the cavity. A spacer element can also be formed by an indentation of the hood, which indentation bears against the chamber wall. The mechanical stability of the hood can be increased by a spacer element of this type.

The invention also relates, in particular, to an apparatus for the metered provision of a liquid, comprising a tank with an interior for storing the liquid and a tank bottom, a described module being inserted in the tank bottom, the hood being arranged in the interior of the tank.

As has been described further above, the module can be connected releasably or non-releasably to the tank. All the special advantages and design features which are described for the module can be transferred in an analogous way to the apparatus for the metered provision of a liquid comprising the tank and the module.

Furthermore, a motor vehicle is proposed, having an internal combustion engine and an exhaust gas treatment apparatus for purifying the exhaust gases of the internal combustion engine and the described apparatus for the provision of a liquid exhaust gas purification additive for the exhaust gas treatment apparatus.

An SCR catalytic converter is preferably provided in the exhaust gas treatment apparatus, by way of which SCR catalytic converter the method of selective catalytic reduction can be carried out. The apparatus comprising a tank and the module is connected via a line to an addition apparatus for the addition of the liquid additive (urea/water solution) to the exhaust gas treatment apparatus. The addition apparatus can have, for example, a metering valve for the metered dispensing of the liquid additive into the exhaust gas treatment apparatus and/or a nozzle for atomizing the liquid additive.

BRIEF DESCRIPTION OF THE DRAWINGS

The invention and the technical field will be explained in more detail below on the basis of the figures. The figures show particularly preferred exemplary embodiments, to which the invention is however not restricted. In particular, it should be noted that the figures and in particular the proportions illustrated in the figures are merely schematic. In the figures.

DETAILED DESCRIPTION OF THE PRESENTLY PREFERRED EMBODIMENTS

Figure 1:
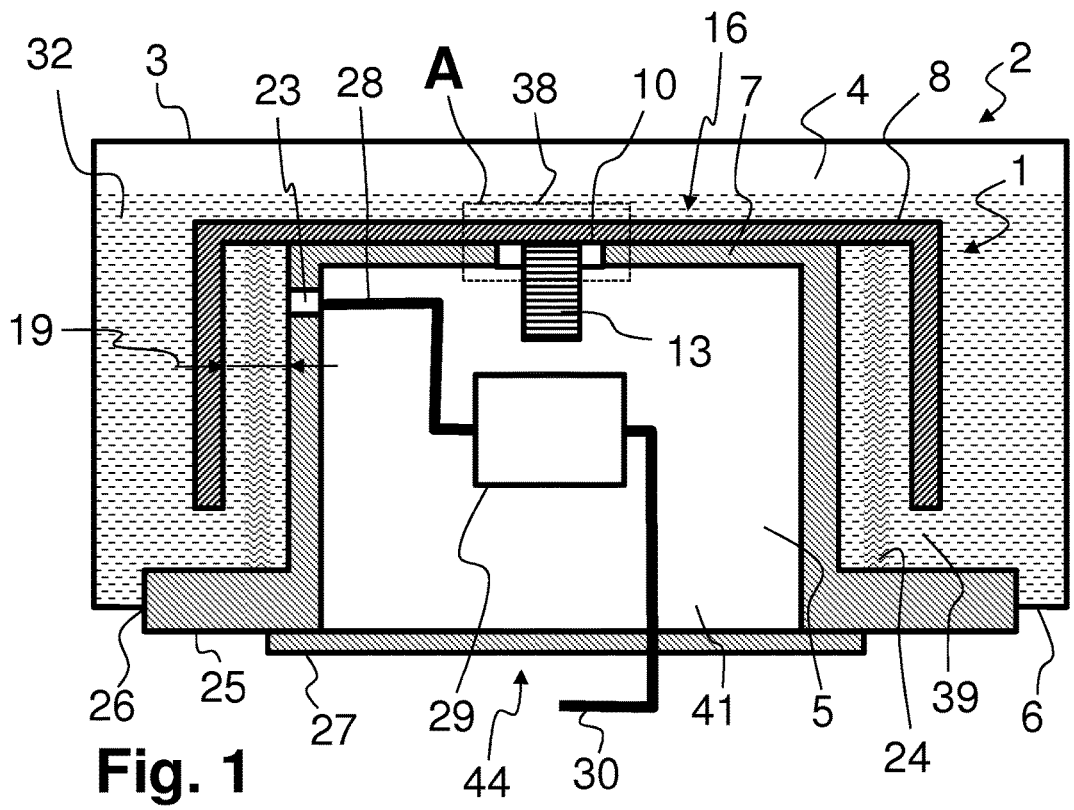
FIG. 1 shows a first embodiment of a module.
Figure 2:
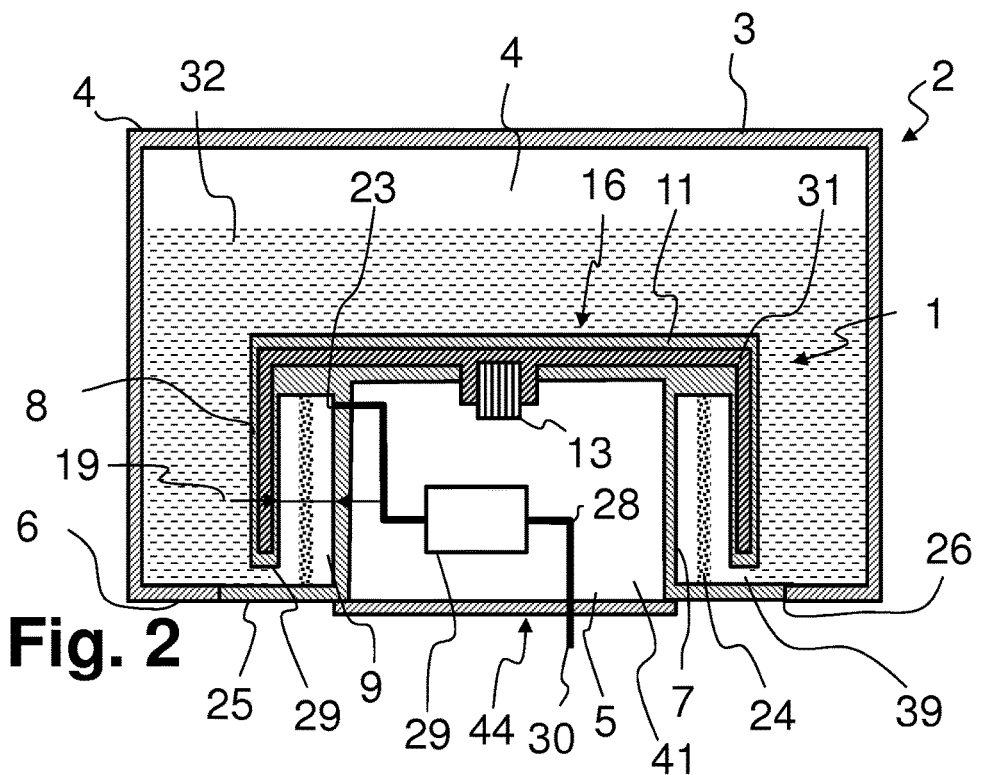
FIG. 2 shows a embodiment variant of a module.

FIGS. 1 and 2 in each case show an apparatus 2, comprising a tank 3 and a module 1 is inserted into the tank bottom 6 of the tank 3. The module 1 in each case has a ("dry") chamber 5 that is separated from the interior 4 of the tank, delimits a chamber space 41 and has a chamber wall 7. The chamber 5 is in each case surrounded by a hood 8, a cavity 9 existing between the hood 8 and the chamber 5. The cavity 9 is a cylindrical space between the chamber wall 7 and the hood 8. A filter 24 is arranged in the cavity 9. The liquid 32 is stored in the interior 4 of the tank 3. The liquid 32 can be sucked into the cavity 9 through an annular gap 39 on an underside 44 of the hood. There, the liquid 32 is cleaned by the filter 24, in order then to be sucked at the intake point 23 into the chamber 5 or into a delivery line 28 arranged in the chamber 5. To this end, a pump 29 is arranged on the delivery line 28 in the chamber 5. The chamber 5 can be closed on the underside 44 by way of a lid 27. The lid 27 is accessible from an outer side of the tank 3. A supply port 30 exists on the bottom side 44 (and also on the lid 27 in the present design variants), at which supply port 30 the module 1 provides liquid from the tank 3.

The cavity 9 between the hood 8 and the chamber 5 or the chamber wall 7 has a thickness 19 that defines a spacing between the hood 8 and the chamber wall 7.

The module 1 in each case has a flange 25, which makes the installation of the module 1 into the tank 3 on the tank bottom 6 of the tank 3 possible. An (individual and electrically controllable) heating element 13, by which the hood 8 can be heated, is provided in each case in the chamber space 41 of the chamber 5. To this end, the heating element 13 is in thermally conducting contact with the hood 8.

In the embodiment according to FIG. 1, the hood 8 is made from metal. The chamber 5 or the chamber wall 7 has a chamber opening 10 on the top side 16. The chamber opening 10 is closed by the hood 8. However, the heating element 13 is in contact with the hood 8 at the chamber opening 10, with the result that the heating element 13 can transmit heat to the hood 8.

In the embodiment in FIG. 2, the hood 8 is produced from plastic and at least one section of a heating element is let into the hood 8 in order to heat liquid in the tank. In the present case, the section for heating is a heat distributing structure 31, by way of which heat can be distributed in the hood 8. The heat distributing structure 31 is likewise in contact with an (individual and electrically controllable) heating element 13 situated in the chamber 5. According to FIG. 2, the hood 8 and the chamber wall 7 of the chamber 5 are produced so as to be integrated with one another.

FIGS. 3 to 6 show isometric views of various embodiments of the hood 8 that can be combined in each case in combination with the concept (shown in FIG. 1) of the metallic hood 8 and with the concept (shown in FIG. 2) of the hood 8 made from plastic with embedded heating.

Figure 3:
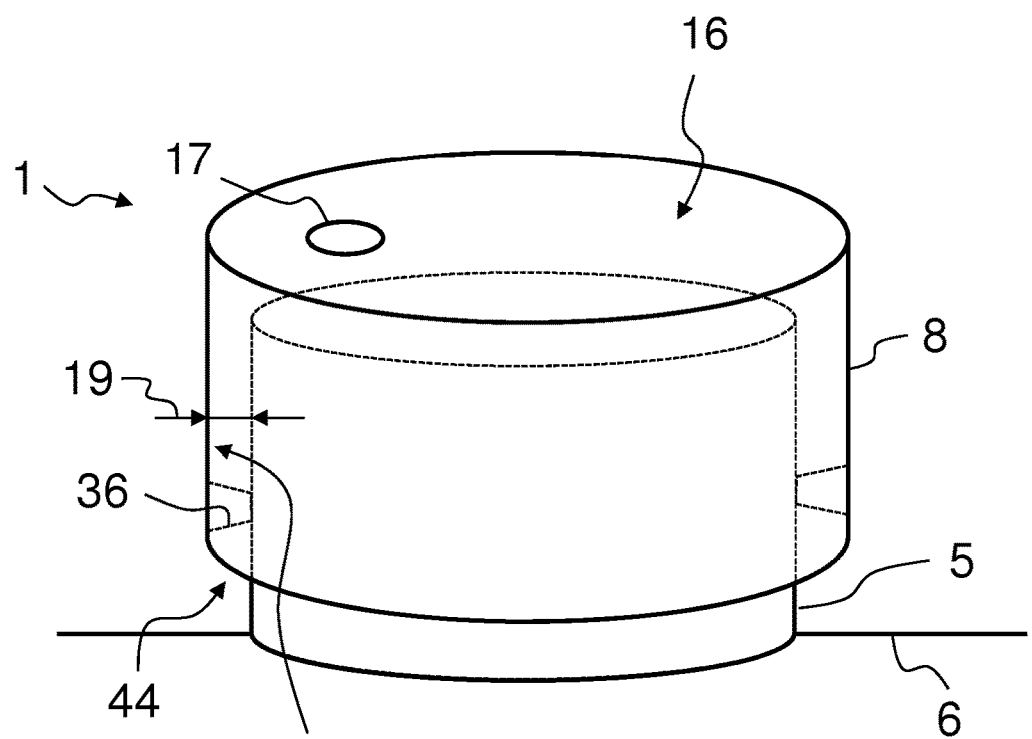
FIG. 3 shows an isometric view of one embodiment of a module.
Figure 4:
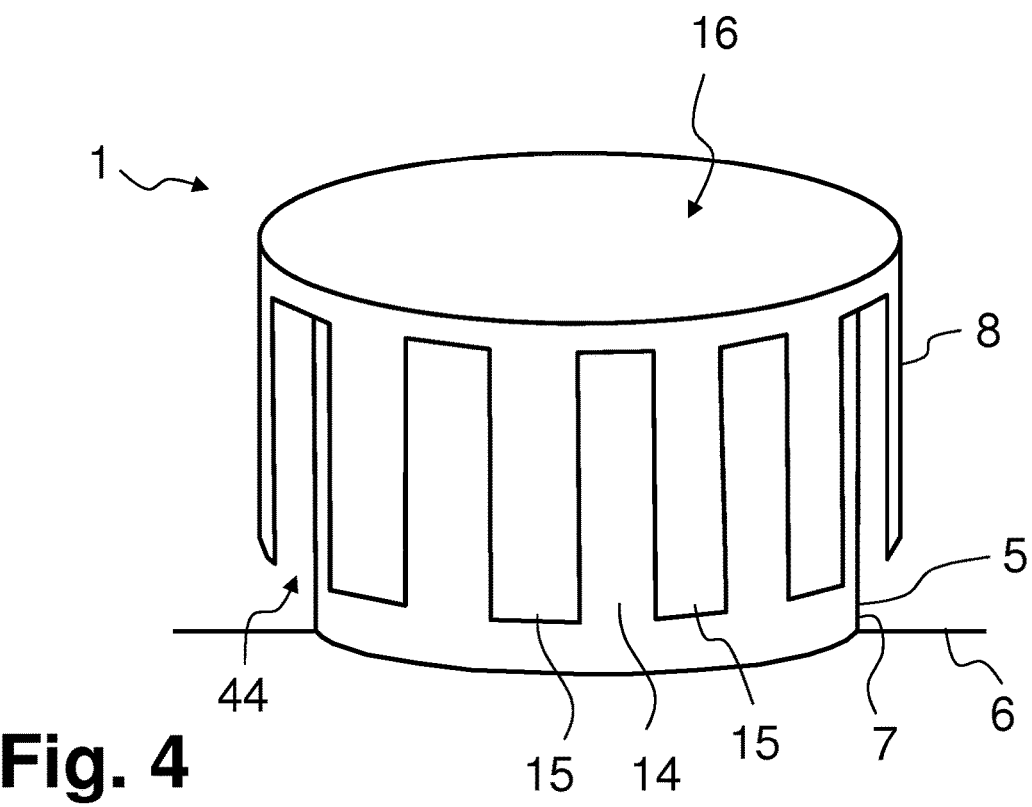
FIG. 4 shows an isometric view of a further embodiment of a module.
Figure 5:
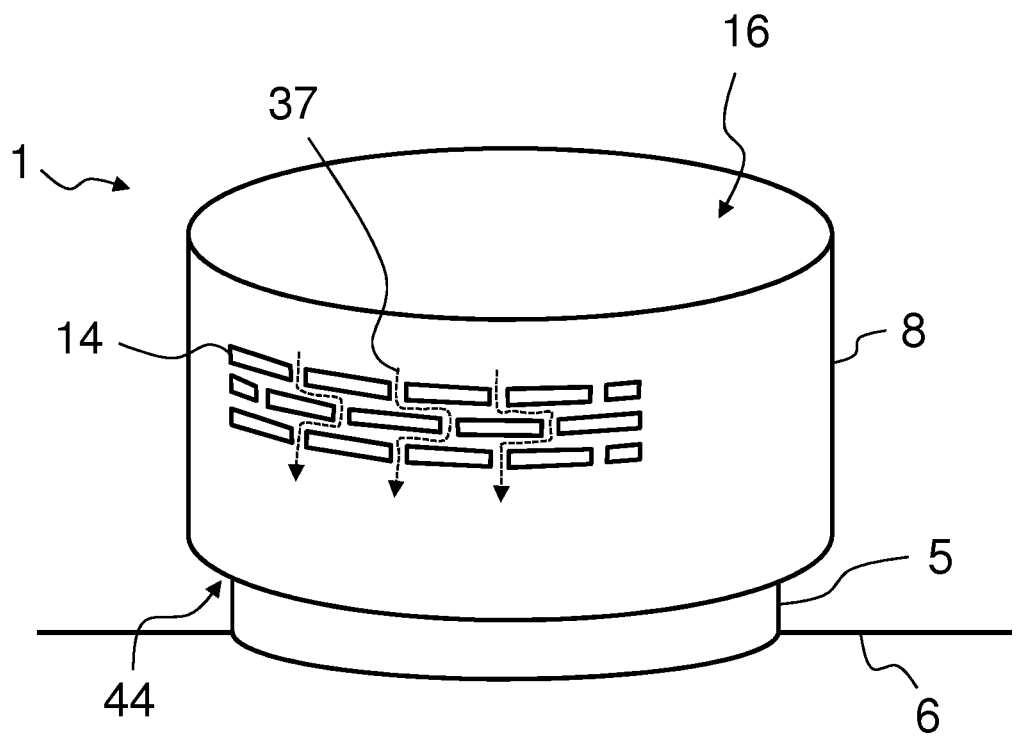
FIG. 5 shows an isometric illustration of yet another embodiment of a module.
Figure 6:
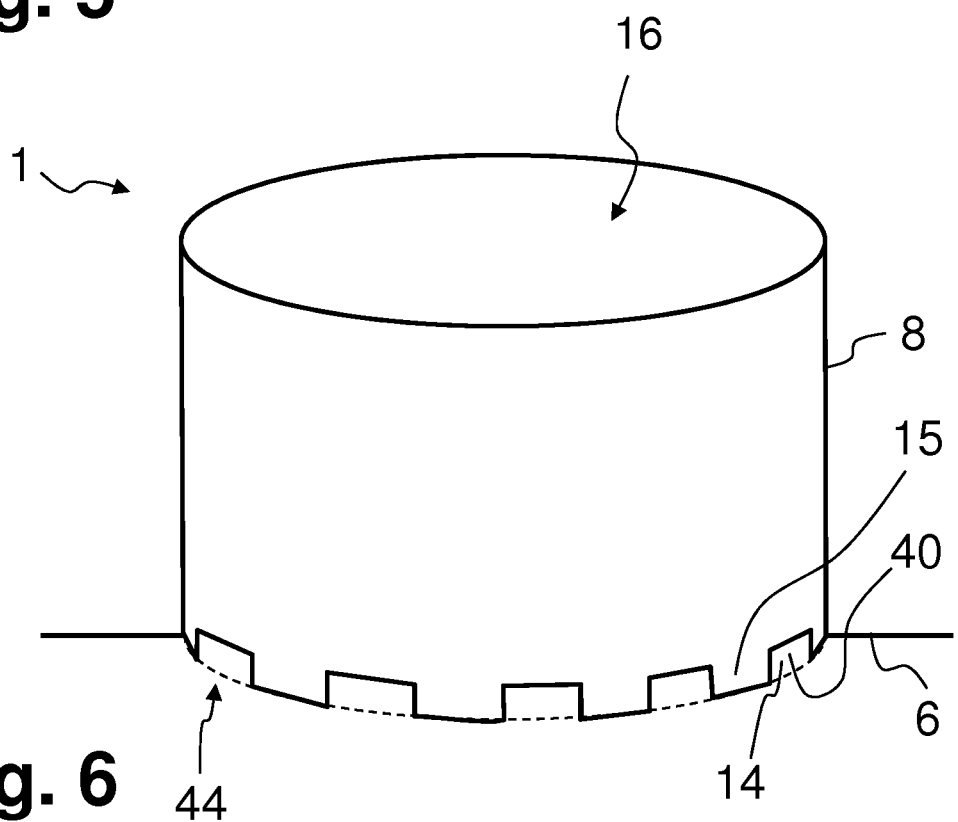
FIG. 6 shows an isometric view of a further embodiment of a module.

The module 1 can be seen in each case on the tank bottom 6 in FIGS. 3 to 6. The chamber 5 can be seen merely in FIGS. 3 to 5 because the chamber 5 in FIG. 6 is concealed completely by the hood 8. The hood 8 is shown in each case with the top side 16 and the bottom side 44 in all figures. FIG. 3 shows that the hood 8 can have a spacer element 36 on its inner side 18 oriented towards the separated chamber 5, by way of which spacer element 36 a spacing between the hood 8 and the chamber wall 7 of the chamber 5 is maintained, in order that the cavity 9 has a thickness 19. In addition, FIG. 3 shows a ventilating opening 17 on the top side 16 of the hood 8.

In FIG. 4, perpendicularly extending slots 14 are provided in the hood 8, which slots 14 run in each case from the bottom side 44 in the direction of the top side 16 of the hood 8. Web-shaped sections 15, which form a comb structure are formed in each case on the hood 8 by the perpendicular slots 14.

In FIG. 5, horizontal slots 14 are provided in the hood 8, which slots 14 influence the heat conduction 37 (indicated by arrows) through the hood 8, by preventing the diffusion of heat through the hood 8.

FIG. 6 shows a hood 8 that corresponds substantially to the hood 8 from FIG. 4, the web-shaped sections 15 reaching as far as the tank bottom 6, however, with the result that the slots 14 form merely very restricted passages 40 on the bottom side 44 of the hood 8, through which passages 40 the liquid can be sucked into the cavity (not shown separately here) between the hood 8 and the chamber 5 (likewise not shown here).

Figure 7:
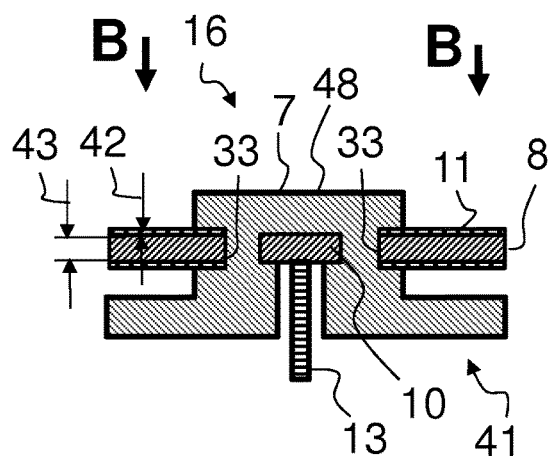
FIG. 7 shows one embodiment for the detail A from FIG. 1.
Figure 9:
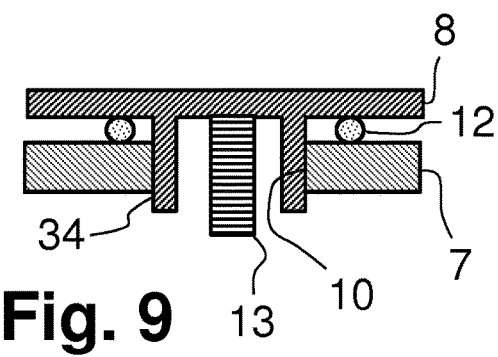
FIG. 9 shows a second embodiment of the detail A from FIG. 1.
Figure 10:
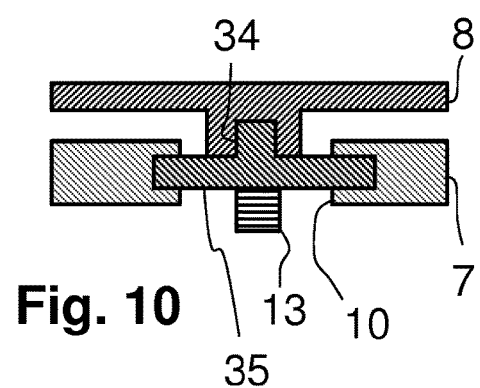
FIG. 10 shows a third embodiment of the detail A from FIG. 1.

FIGS. 7, 9 and 10 show three different embodiments, showing how the detail A from FIG. 1 can be configured. The detail A from FIG. 1 shows the seal of the hood 8 at the chamber opening 10 of the chamber wall 7.

Figure 8:
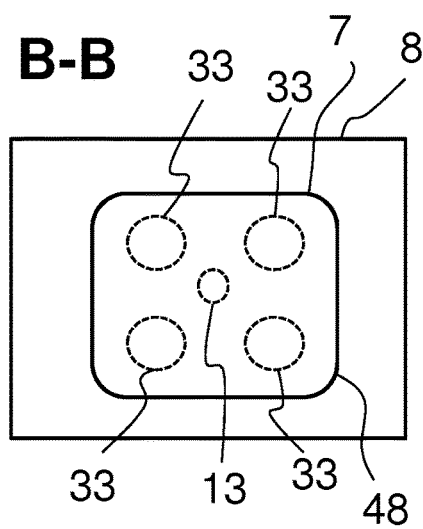
FIG. 8 shows another view of the embodiment (shown in FIG. 7) of the detail A from FIG. 1.

In FIG. 7, the hood 8 has a metallic base material with a metal thickness 43. The metallic base material is coated with a plastic layer 11 having a layer thickness 42. The chamber wall 7 is produced from plastic and enters into a material-to-material connection with the plastic layer 11. A chamber opening 10 of the chamber wall 7 still exists here only indirectly in the regions in which the metallic base material of the hood 8 penetrates the chamber wall 7. A region of the hood 8 is not arranged outside the chamber wall 7 in the interior of the tank, but rather inside the chamber 5 in the chamber space 41. The region of the hood 8 preferably does not have a plastic layer 11, with the result that a heating element 13 in the chamber space 41 can bear directly against the hood 8 or against the metallic base material of the hood 8. In order that the plastic material of the chamber wall 7 and the metallic base material of the hood 8 can penetrate one another, the hood 8 has connecting holes 33 in the region of the opening 10. The connecting holes 33 make it possible that a plug 48 is formed on a top side 16 of the hood 8, which plug 48 is composed of the plastic material of the chamber wall 7 and closes the connection between the chamber wall 7 and the hood 8. In order to illustrate the variant (shown in FIG. 7) of the detail A from FIG. 1 in an improved manner, FIG. 8 shows a view of the connection, shown in FIG. 7, from above. A section of the hood 8 and the plug 48 can be seen, which plug 48 is a constituent part of the chamber wall 7 but is nevertheless situated above the hood 8. The connecting holes 33 and the heating element 13 are shown using dashed lines (that is to say, concealed by the plug 48).

FIG. 9 shows one embodiment of the detail A from FIG. 1, in which the hood 8 is screwed by way of a thread 34 into the chamber opening 10. A seal 12 (for example, made from durable rubber) exists in addition, by way of which seal 12 the chamber wall 7 and the hood 8 are sealed against one another. The heating element 13 can then act directly on the hood 8.

According to the embodiment of detail A from FIG. 1 in FIG. 10, a metallic contact plate 35 is integrated into the chamber wall 7, which metallic contact plate 35 makes thermal conduction from the heating element 13 to the hood 8 possible. Here, the hood 8 is attached to the metallic contact plate 35 (and therefore also to the chamber 5) by way of a thread 34.

Figure 11:
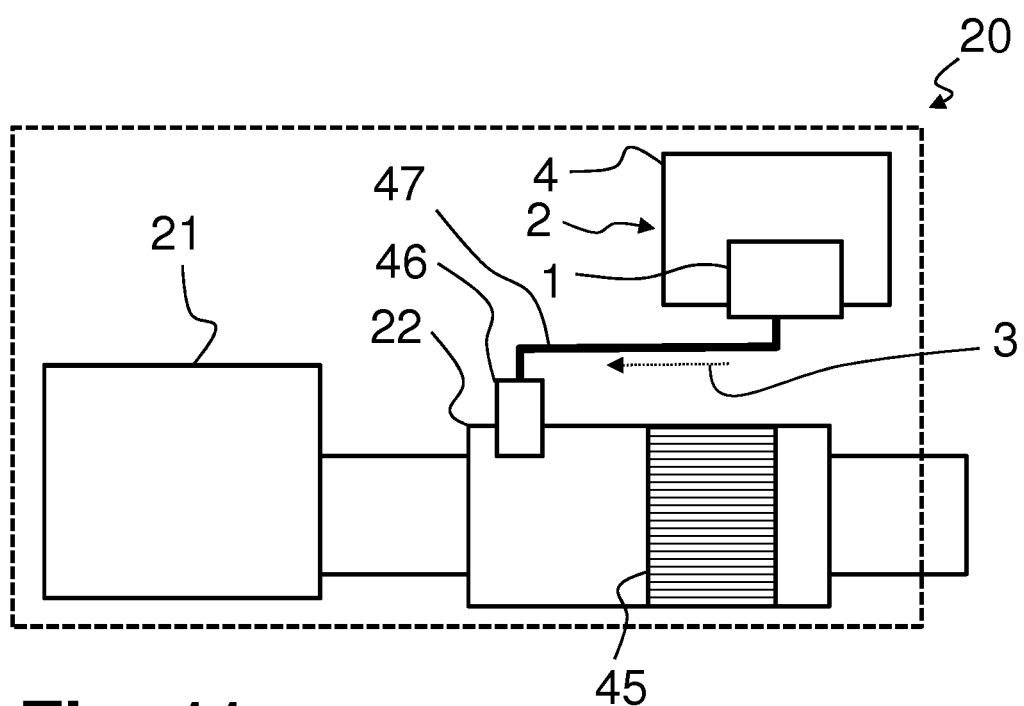
FIG. 11 shows a motor vehicle, having an apparatus for the metered provision of a liquid with a module.

FIG. 11 shows a motor vehicle 20 having an internal combustion engine 21 and having an exhaust gas treatment apparatus 22 for the purification of the exhaust gases of the internal combustion engine 21. In the exhaust gas treatment apparatus 22 there is provided an SCR catalytic converter 45 by which the method of selective catalytic reduction can be carried out. The exhaust gas treatment apparatus 22 can be fed a liquid additive (for example, urea/water solution) by an addition apparatus 46. The addition apparatus 46 is supplied with liquid additive via a line 47 from an apparatus 2. The apparatus 2 comprises a module 1 as described and a tank 3 for storing the liquid additive.

By way of precaution, it is also pointed out that the combinations of technical features shown in the figures are not generally binding. For example, technical features from one figure may be combined with other technical features from another figure and/or from the general description. The only exception to this is if the combination of features has been explicitly referred to here and/or a person skilled in the art identifies that the basic functions of the apparatus can no longer be realized otherwise.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMERALS

1 Module
2 Apparatus
3 Tank
4 Interior
5 Chamber
6 Tank bottom
7 Chamber wall
8 Hood
9 Cavity
10 Chamber opening
11 Plastic layer
12 Seal
13 Heating element
14 Slot
15 Section
16 Top side
17 Ventilating opening
18 Inner side 19 Thickness
20 Motor vehicle
21 Internal combustion engine
22 Exhaust gas treatment apparatus
23 Intake point
24 Filter
25 Flange
26 Tank bottom opening
27 Lid
28 Delivery line
29 Pump Supply port
30 Heat distributing structure Liquid
31 Connecting hole
32 Thread
33 Metallic contact plate Spacer element
34 Heat conduction
35 Detail
36 Annular gap Passage
37 Chamber space
38 Layer thickness
39 Metal thickness
40 Bottom side
41 SCR catalytic converter
42 Addition apparatus
43 Line
44 Plug

The invention claimed is:

1. An apparatus (2) for metered provision of a liquid exhaust gas purification additive, the apparatus (2) comprising:
 a tank (3) having:
  an interior (4) configured to store the liquid, and
  a tank bottom (6); and
 a module (1) inserted into the tank bottom (6), the module (1) having:
  a chamber (5) having a chamber wall (7), the chamber wall (7) at least partially enclosing a chamber space (41);
  a hood (8) at least partially surrounding the chamber (5);
  an electric heating element (13) arranged in the chamber space (41); and
  at least one cavity (9) arranged between the hood (8) and the chamber (5),
 wherein the hood (8) and the electric heating element (13) are arranged with respect to one another so that the hood (8) is heatable by the electric heating element (13),
 wherein the chamber wall (7) has a chamber opening (10) closed by the hood (8),
 wherein the hood (8) is sealed at the chamber opening (10) by a seal (12) that surrounds the electric heating element (13), and
 wherein the hood (8) is arranged in the interior (4) of the tank (3).

2. The apparatus (2) according to claim 1, wherein the hood (8) comprises metal.

3. The apparatus (2) according to claim 2, wherein the hood (8) is coated with a plastic layer (11).

4. The apparatus (2) according to claim 1, wherein the hood (8) comprises plastic and at least one heat distributing structure (31) is arranged so as to be integrated into the hood (8).

5. The apparatus (2) according to claim 1, wherein the hood (8) is connected in a material-to-material manner to the chamber wall (7) at the chamber opening (10).

6. The apparatus (2) according to claim 1, wherein the hood (8) is connected at the chamber opening (10) to the electric heating element (13) arranged in the chamber space (41).

7. The apparatus (2) according to claim 1, wherein the hood (8) has a plurality of slots (14) configured to divide the hood (8) into web-like sections (15) extending from a top side (16) to an underside (44) of the chamber (5) of the tank bottom (6).

8. The apparatus (2) according to claim 1, wherein the hood (8) has at least one slot (14) configured to thermally insulate a region of the hood (8).

9. The apparatus (2) according to claim 1, wherein the hood (8) has a ventilating opening (17) connecting the at least one cavity (9) at a top side (16) of the chamber (5) to the surroundings of the chamber (5).

10. The apparatus (2) according to claim 1, wherein the hood (8) has at least one spacer element (36) on an inner side (18) oriented towards the chamber (5), which at least one spacer element (36) bears against the chamber wall (7).

11. A motor vehicle (20), comprising:
 an internal combustion engine (21);
 an exhaust gas treatment apparatus (22) configured to purify exhaust gases of the internal combustion engine (21); and
 the apparatus (2) according to claim 1 configured to provide the liquid exhaust gas purification additive to the exhaust gas treatment apparatus (22).

* * * * *